Dec. 8, 1953  J. B. McGAY ET AL  2,661,815
CHART DRIVE MECHANISM
Filed April 22, 1949  2 Sheets-Sheet 1
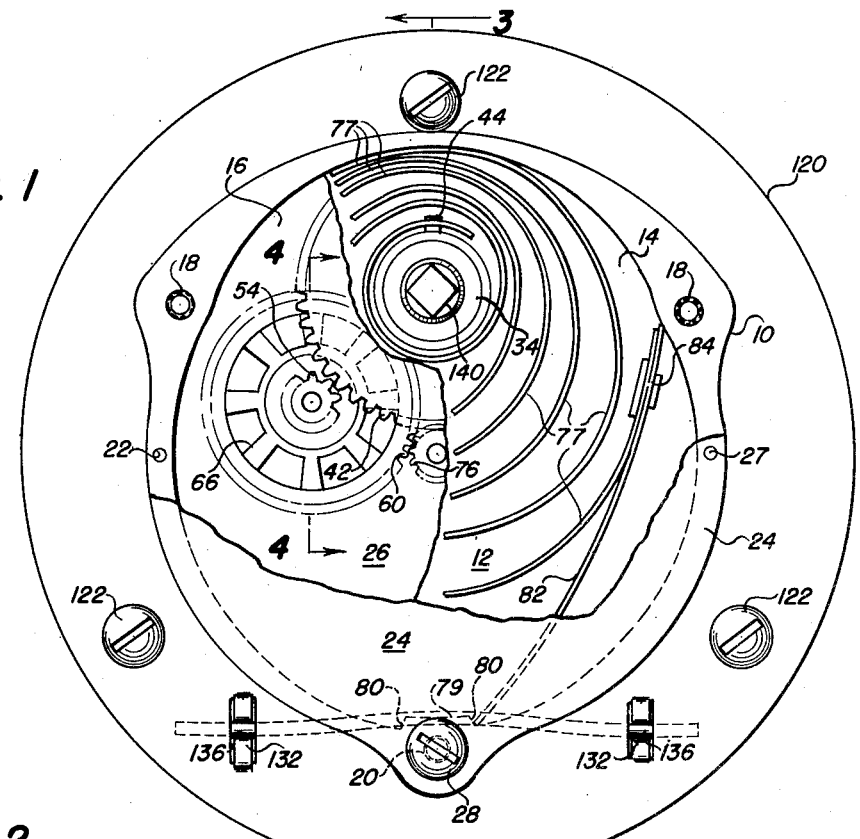
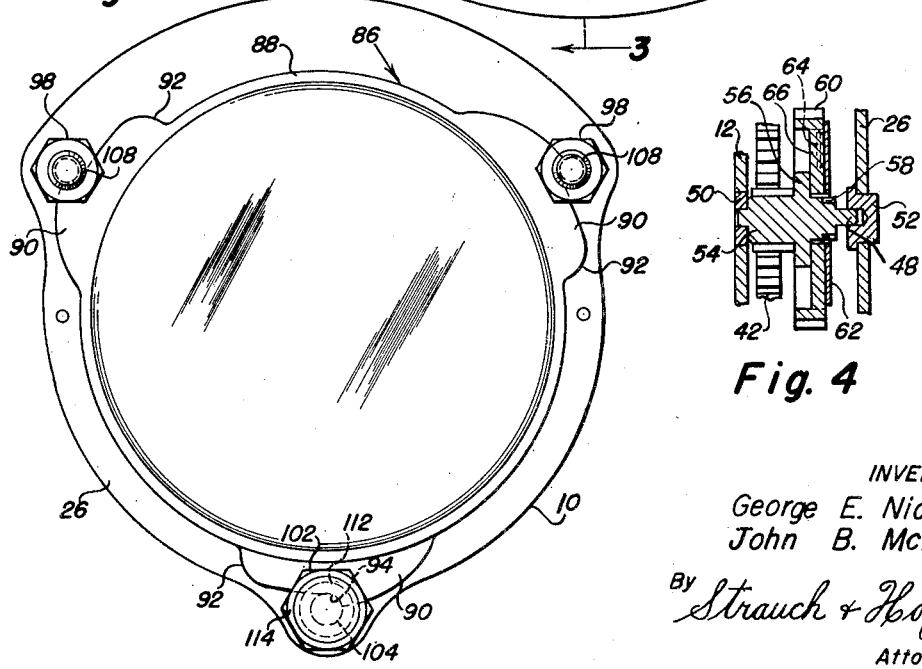
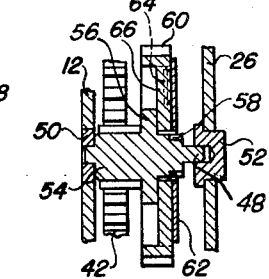
INVENTORS
George E. Nicholson
John B. McGay
By *Strauch & Hoffman*
Attorneys

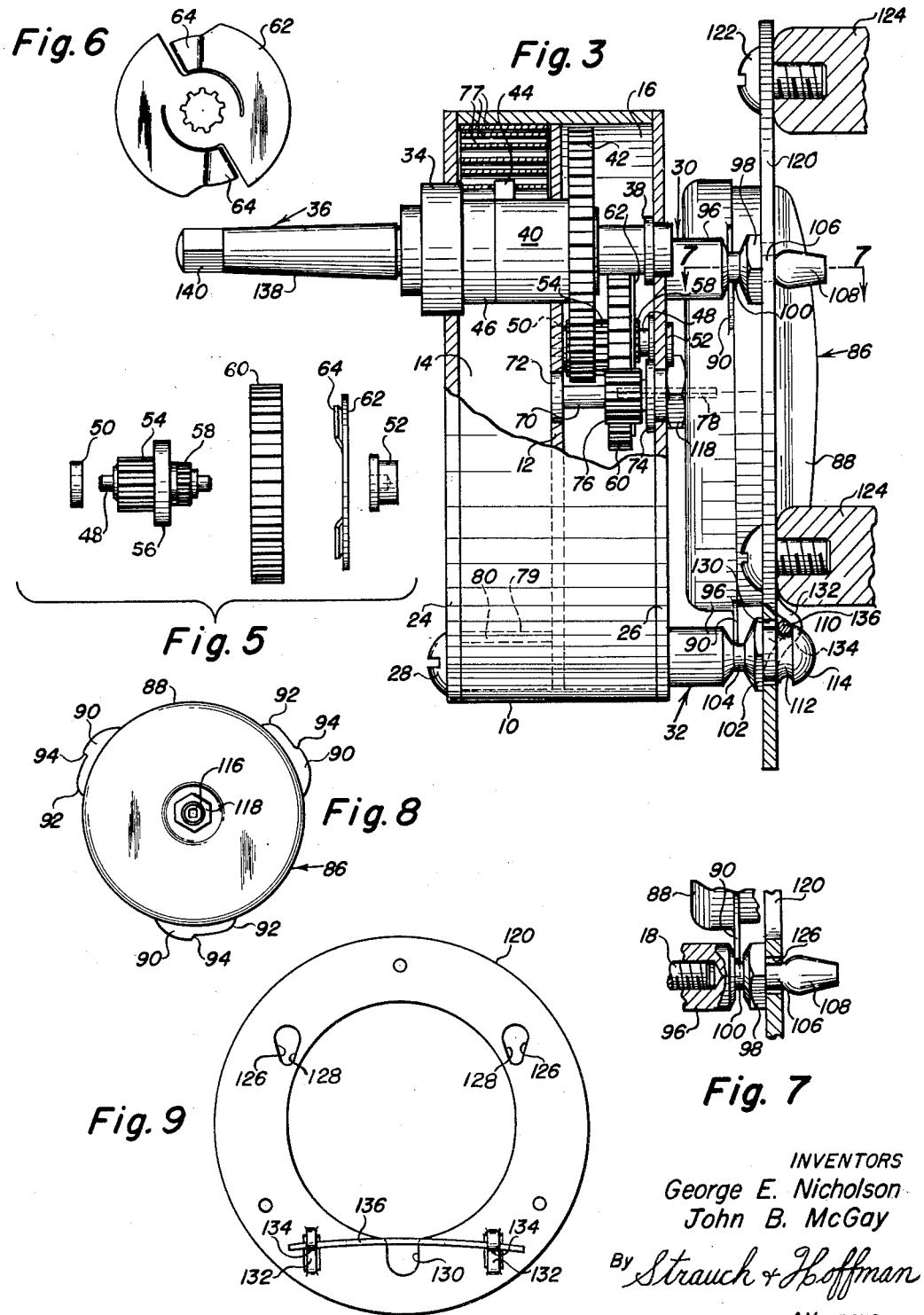

Patented Dec. 8, 1953

2,661,815

UNITED STATES PATENT OFFICE 2,661,815

CHART DRIVE MECHANISM

John B. McGay and George E. Nicholson, Tulsa, Okla., assignors to Rockwell Register Corporation, a corporation of New York Application April 22, 1949, Serial No. 89,037

8 Claims. (Cl. 185—38)

This invention relates to operating mechanism for meter charts or the like and has for its general object and purpose to provide a highly compact and novel assembly of the drive mechanism for the chart shaft or hub with novel means for removably mounting the assembly upon an instrument panel where space for the larger standard chart drives is not available.

It is another object of the invention to provide drive mechanism for the above purpose embodying a spring energized clock unit together with an interchangeable escapement unit and means for removably mounting the escapement unit in operatively assembled relation with the clock unit so that, by the use of easily interchangeable escapement units, the rate of rotation of the chart by the clock unit may be selected.

It is a further object of the invention to provide means for detachably locking the clock and escapement unit upon a mounting plate with the escapement unit having means coacting with parts of said locking means to removably retain said escapement unit in operatively assembled relation with the clock unit.

It is an additional object of the invention to provide an operating mechanism for meter charts as above characterized, in which the energizing spring for the clock unit is directly connected with the chart shaft or arbor and is wound by rotation of said shaft.

A further object of the invention resides in the provision of a novel ratchet gear assembly whereby, in the rotation of the chart shaft to wind the clock spring, torque stresses will not be transmitted to the mechanism of the escapement unit.

It is another object of the invention to provide a clock case of novel construction with means for reversibly mounting the clock spring therein so that the chart shaft may be driven thereby in either clockwise or anti-clockwise direction.

Still another object of the invention resides in the provision of a mounting plate of very simple construction provided with novel means to resiliently coact with a locking member carried by the drive assembly to detachably secure said assembly in rigidly supported position upon said mounting plate.

With the above and other objects in view, the invention comprises the improved operating mechanism for meter charts or the like, and the construction and relative arrangement of its several parts as will hereinafter be more fully described, illustrated in the accompanying drawings and subsequently incorporated in the subjoined claims.

In the drawings wherein we have disclosed one simple and practical embodiment of the invention and in which similar reference characters designate corresponding parts throughout the several views.

Figure 1 is a front elevation with certain of the parts broken away to show the primary elements of the clock mechanism;

Figure 2 is a rear elevation;

Figure 3 is a vertical sectional view taken substantially on the line 3—3 of Figure 1 and showing the drive assembly detachably locked upon the mounting plate within the instrument case;

Figure 4 is a detail vertical section taken substantially on the line 4—4 of Figure 1;

Figure 5 is an elevation of the parts of the ratchet gear assembly;

Figure 6 is a plan view of the ratchet plate;

Figure 7 is a detail horizontal section taken substantially on the line 7—7 of Figure 3;

Figure 8 is a detail front side elevation of the escapement unit; and

Figure 9 is a rear side elevation of the mounting plate.

Referring in further detail to the drawings the clock unit comprises a case of relatively small diameter, the body 10 of which may be inexpensively formed from a suitable plastic material, or as a simple die casting of metal. This case body is interiorly divided by the metal partition plate 12 into a spring compartment 14 and a gear compartment 16.

In the upper portion of the case body wall and at opposite sides thereof axially extending pins 18 are secured and in the central bottom portion of said wall a similar pin 20 is secured. Opposite end portions of these pins are threaded and project beyond the edge faces of the case wall. In each edge face of this wall below the pins 18 suitable dowel pin receiving recesses 22 are formed.

The open side of the spring compartment 14 of the clock case is closed by the front cover plate 24 while the open side of the gear compartment 16 is closed by similar rear cover plate 26. These plates carry dowel pins as indicated at 27 fitting within the recesses 22 and suitably spaced openings registering with the threaded ends of the pins 18 and 20. Upon the front ends of these pins the cap screws 28 are threaded to securely clamp the front cover plate 24 against the edge face of the case body wall. Locking studs 30 are threaded upon the rear ends of the pins 18 and a locking stud 32 of somewhat different form is also threaded upon the rear end of pin 20 to tightly clamp the rear cover plate 26 against the case body wall. The construction and purpose of these locking studs will be hereinafter explained in further detail.

In the front plate 24 above the center thereof a bearing bushing 34 for the chart shaft or arbor 36 is suitably secured. The rear reduced end of this shaft is journalled in a bearing bushing 38 mounted in the rear cover plate 26. Upon an intermediate section of shaft 36 a sleeve 40 is keyed or otherwise non-rotatably fixed and extends rearwardly through an opening in the partition plate 12. The rear end of this sleeve within the compartment 16 is of reduced diameter and upon the same a large diameter spur gear 42 is suitably fixed. At its forward end the sleeve 40 is formed with a spring attaching lug 44 projecting radially therefrom approximately midway between the front cover plate 24 and partition plate 12. A spacing collar 46 surrounds the shaft or arbor 36 between the forward end of sleeve 40 and the rear end of bearing bushing 34.

Below the shaft 36 and out of vertical alignment therewith a shaft 48 is journalled at its opposite ends for rotation in bearing members 50 and 52 suitably mounted respectively in the partition plate 12 and rear cover plate 26. A pinion 54 is integrally formed with the forward end portion of this shaft and is in constant mesh with the chart shaft gear 42. At the rear side of this pinion flange 56 is integrally formed therewith and in spaced relation to this flange teeth or splines 58 are formed on the pinion shaft. Between flange 56 and the teeth 58 a ratchet gear 60 is loosely mounted for free rotation on the pinion shaft.

A ratchet plate 62 of spring metal, as shown in Figure 6, is centrally provided with an opening the edge of which is formed with teeth corresponding to the teeth 58 on shaft 48 and with which they are adapted to interlock to thus non-rotatably secure the ratchet plate to said shaft. This plate at diametrically opposite points is formed with the spring tongues 64 projected in the same direction out of the plane of said plate and extending circumferentially thereof in relatively opposite directions. The ratchet gear 60 is formed with hub and rim portions integrally connected by the spaced radial spokes 66 with which the free ends of the spring tongues 64 on the ratchet plate are adapted to coact to thus connect gear 60 with the ratchet plate for rotation as a unit in one direction with the shaft 48.

In vertical alignment with the chart shaft or arbor 36 and coaxially of the casing compartment 16, a shaft 70 is rotatably journalled at its opposite ends in bearing members 72 and 74 respectively mounted in the partition plate 12 and rear cover plate 26. This shaft is provided with an integrally formed pinion 76 which is in constant mesh with the ratchet gear 60. The rear end portion of this shaft is formed with a rectangular axially extending bore to receive one end of a square coupling shaft 78 the other end of which projects beyond the rear face of cover plate 26.

The spiral clock spring 77 is housed within the compartment 14 of the case. This spring at its inner end is provided with a suitable slot or opening and is hooked over the radially projecting lug 44 on the sleeve 40 fixed to the chart shaft or arbor 36. The casing wall at the bottom center thereof is internally formed with an upstanding boss 79 providing laterally spaced shoulders 80. One end of a longitudinally bowed relatively strong spring leaf 82 is engaged at one end with one of the shoulders 80 and extends upwardly therefrom above the center of the case and has bearing contact at its upper end against the circumferential surface of the case wall. To this latter end of the bowed leaf 82 the other or outer end of the clock spring 77 is securely riveted as at 84. As shown in the drawing the spring 77 is positioned to rotate the chart shaft or arbor 36 in anti-clockwise direction. However, by reversing the position of the spring with the spring leaf 82 positioned at the opposite side of the vertical center line of the case and in abutting contact with the other of the shoulders 80, the chart shaft or arbor will then be rotated in the clockwise direction as the spring unwinds.

It will be understood that when the spring is so installed simple modifications will be made in the gear train and particularly the one-way drive mechanism to permit winding of the spring and transmission of the drive to the escapement mechanism as the spring unwinds.

The action of the clock spring 77 and the rate of rotation of the shaft 36 and the chart during a predetermined time period of operation is controlled by an escapement unit generally indicated at 86. By interchangeably coupling properly selected escapement units with the pinion 76 the same clock mechanism may be used for the operation of differently calibrated one day, seven day or thirty day charts. These escapement units may be of any approved standard construction. A special escapement unit is employed when it is desired to rapidly rotate the chart for test purposes. The mechanism is enclosed within a hermetically sealed case 88, and for the purpose of this description, it will suffice to state that this mechanism includes a shaft element journalled in the case axially thereof and having a square bore at one of its ends to receive the square coupling shaft 78 projecting from the rear side of the clock case.

As shown in Figure 8 of the drawings a rim portion of the case 88 is provided with a plurality of spaced outwardly projecting flanges 90 corresponding in number to the number of locking studs 30 and 32, each of said flanges having a cam edge 92 and a stop shoulder 94 at one end thereof.

The locking studs 30 and 32 have cylindrical end portions 96 provided with threaded bores which receive the rearwardly projecting threaded ends of the pins 18 and 20. In spaced relation from each cylindrical portion 96 the two studs 30 are formed with the flanges 98 having flat outer side faces. The inner side faces of these flanges and the opposed ends of the cylindrical portions 96 of the studs are convergently beveled inwardly to a cylindrical neck portion 100 of relatively small diameter. The lower locking stud 32 is similarly formed with a flange 102 of somewhat greater diameter than the flanges 98 on the studs 30 and with the connecting neck portion 104 between the flange 102 and the cylindrical end portion of the stud.

The studs 30 rearwardly of the flanges 98 are formed with shallow annular grooves 106 and axially tapering terminal portions 108. The lower locking stud 32 at the rear side of flange 102 has a narrow cylindrical portion 110 of substantially the same diameter as the end portion 96 of the stud and outwardly thereof is formed with an annular groove 112 and a conical or dome shaped terminal head 114.

In the front side wall of the escapement case axially thereof a guide bushing 116 is secured by nut 118. In assembling the clock and escapement units the latter is inserted from the rear between the studs 30 and 32 on the clock case with the flanges 90 circumferentially positioned between said studs. By relative axial movement, the projecting end of the square coupling shaft 18 is received through the guide bushing 116 and into the square bore of the shaft element of the escapement mechanism, at which time the nut 118 is in substantial contact with the face of the rear cover plate 26 of the clock unit, and the flanges 90 on the escapement case 88 are positioned in substantial alignment with the neck portions 100 and 104 of the locking studs. Upon now slightly rotating the escapement unit, the cam edges 92 of flanges 90 frictionally ride upon the cylindrical surfaces of the neck portions 100 and 104 of the locking studs until the shoulders 94 on said flanges contact therewith. The escapement unit is thus securely though releasably retained in operatively assembled relation with the clock unit.

In Figures 3 and 9 of the drawings we have shown means for easily and quickly mounting this chart clock and escapement assembly on an instrument case or removing the same therefrom. In the present instance, we have shown an annular mounting plate 120 which may be provided with suitable adapter means for application to any instrument case. However, in Figure 3 of the drawings this mounting plate is rigidly secured by means of screws 122 to bosses 124 formed in the instrument case. This mounting plate in the upper portion thereof is provided with openings 126 in substantially the same spaced apart relation as the pins 18 on the clock case and the locking studs 30. The upper portions of these openings are of circular form, each having a downwardly extending tapering portion 128. In the lower portion of the plate 120, centrally thereof, a vertical slot or recess 130 is formed the upper end of which opens upon the inner edge of the annular plate.

In spaced relation from the slot 130 at each side thereof vertically disposed strap portions 132 are punched or struck and project from the plane of said plate at the rear side thereof. Each of these strap portions 132 intermediate of its ends is indented to form a supporting shoulder 134 for the ends of a bowed resilient rod 136 inserted between said strap portions and the rear face of the plate 120. This resilient rod at its center extends across the upper open end of the slot 130 in the mounting plate. The width of the slot is slightly greater than the diameter of the part 110 on the lower locking stud 32 for the clock case.

In mounting the drive assembly upon the plate 120, the case 88 of the escapement unit is fitted within the opening of the annular mounting plate while the tapering terminals 108 of the upper locking studs 30 move rearwardly through the openings 126 in said plate. The conical head 114 on the lower stud 32 in passing through the slot 130 in the mounting plate encounters the resilient locking rod 136 the central portion of which is sprung from its normal position and received in groove 112 of the stud 32 as the rear flat faces of the flanges 98 and 102 on the studs contact the front face of the mounting plate 120. The downward pressure of rod 136 on stud 32 positions the neck portions 100 of the upper studs 30 in the tapered lower ends 128 of the openings 126 in the mounting plate. Thus in the mounting of the drive assembly it is securely locked in the instrument case at three separate points.

To change the escapement unit, or for other purposes, the chart drive assembly may be easily and quickly dismounted from the instrument case by merely lifting the assembly upwardly slightly relative to the mounting plate 120 against the resistance of the resilient locking rod 136 so that the locking studs 30 and 32 may be withdrawn forwardly through the openings in said plate.

The forwardly projecting portion of the shaft or arbor 36 is tapered as at 138 to receive a chart holding hub and terminates in a square or polygonal end portion 140 to which a socket type key may be applied after each operation for the predetermined timed period, to rewind the spring 77. In this operation pinion 54 and shaft 48 will be rotated by gear 42 reversely to the chart driving direction and the spring tongues 64 of ratchet plate 62 fixed to the pinion shaft will ride over the spoke elements 66 of the ratchet gear 60, and said gear and the escapement drive pinion 76 will remain stationary so that no torque stresses will be transmitted to the elements of the escapement mechanism in the winding of the clock spring. Thus the provision of an additional opening in the front plate 24 of the clock case to receive a spring winding key is avoided. Preferably, for greater ease and facility in the replacement or substitution of charts, without mutilation thereof, a chart holding hub of the type disclosed in our application Serial No. 655,916, filed March 21, 1946, is mounted on the driving shaft or arbor 36.

From the above description, it will be seen that the present invention provides a drive mechanism for meter charts or the like which will be functionally positive and reliable in operation and comprises the minimum number of compactly assembled parts so that the drive assembly may be readily mounted in an instrument case of relatively small size, where space for the conventional chart drive assembly of larger dimensions is not available. It will be seen that the clock unit of the drive mechanism as above described has considerable merit by reason of its extreme simplicity and the fact that the energerizing spring therefor may be readily mounted and arranged within the clock case to drive the chart in either direction. The interior of the clock case may be hermetically sealed by the application of a suitable sealing medium between the front and rear cover plates and body wall of the case.

The means which we provide for interchangeably and quickly and accurately assembling the escapement units with the clock mechanism is also an important feature of the present invention, as well as the means for detachably locking the composite assembly to the mounting plate within the instrument case. While other specifically different types of clock mechanisms might be employed, we have found that for best results in practical operation and the smooth and accurate control of the transmission of the drive to the chart at a predetermined rate, the construction and assembly of the invention as herein disclosed, is most desirable.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Chart operating mechanism comprising a spring and a casing therefor, a chart hub driven by said spring and projecting from the front of said casing, a plurality of spaced posts projecting from the rear of said casing, a separate escapement unit having means adapted to coact with the respective posts to releasably mount the escapement unit in assembled relation upon the casing, releasable means coupling said escapement unit with the spring to control the rate of rotation of the chart hub, a mounting plate adapted to be secured to an instrument panel, and means on said plate adapted to coact with additional means on said posts to detachably mount said escapement unit on said plate.

2. The chart operating mechanism defined in claim 1, wherein said plate also extends over the coacting means on said posts and said escapement unit so that separation of the plate and casing is necessary before the escapement unit can be separated from the casing.

3. In a chart hub drive, a spring motor casing having a chart mounting hub projecting from the front, a plurality of circumferentially spaced members projecting from the rear of said casing, an escapement unit releasably coupled to said spring motor and detachably mounted between said members, and an instrument panel mounting plate yieldably secured upon said members rearwardly of and separately from said escapement unit mounting.

4. In the chart hub drive defined in claim 3, said means for yieldably securing the mounting plate on said members comprising apertures in said plate fitting over at least two of said members and a resilient snap fit connection between another one of said members and said plate.

5. In the chart hub drive defined in claim 4, said snap fit connection comprising a spring rod anchored at its ends to traverse one side of an aperture in said plate and a cooperating locking groove on the associated member.

6. In drive means for meter charts or the like comprising a motor having a casing and a control mechanism therefor contained in a separate casing and adapted to be operatively coupled to said motor; means for removably mounting said control mechanism externally on the motor casing comprising a plurality of fixed studs on one of said casings and means on the other of said casings interlocking with complementary means on said studs by relative movement of said casings to detachably support said control mechanism in coupled relation with said motor.

7. The invention as defined by claim 6, wherein said casing of the control mechanism is supported between said studs and the interlocking means comprises a plurality of spaced elements on said casing coacting with the complementary means on the respective studs.

8. The invention as defined by claim 7, in which each of said elements is a cam projecting from the periphery of said casing and effectively interlocked with means on said studs by rotative displacement of said casing relative to the motor casing.

JOHN B. McGAY.
GEORGE E. NICHOLSON.

References Cited in the file of this patent
UNITED STATES PATENTS

| Number | Name | Date |
|---|---|---|
| 230,262 | Fitt | July 20, 1880 |
| 1,389,953 | Loebker | Sept. 6, 1921 |
| 1,874,967 | Greenleaf | Aug. 30, 1932 |
| 1,909,073 | Putnam | May 16, 1933 |
| 2,102,268 | Hoppenstand | Dec. 14, 1937 |
| 2,161,207 | Smith | June 6, 1939 |
| 2,393,671 | Wolfe | Jan. 29, 1946 |
| 2,497,079 | Godley | Feb. 14, 1950 |
| 2,531,138 | Lehde | Nov. 21, 1950 |
| 2,543,032 | Laviana | Feb. 27, 1951 |

FOREIGN PATENTS

| Number | Country | Date |
|---|---|---|
| 502,153 | Germany | July 11, 1930 |
| 720,656 | France | Dec. 4, 1931 |